US011880156B2

(12) United States Patent
Takehana

(10) Patent No.: US 11,880,156 B2
(45) Date of Patent: Jan. 23, 2024

(54) IMAGE FORMING APPARATUS

(71) Applicant: KYOCERA Document Solutions Inc., Osaka (JP)

(72) Inventor: Hiroki Takehana, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 288 days.

(21) Appl. No.: 17/524,779

(22) Filed: Nov. 12, 2021

(65) Prior Publication Data

US 2022/0155715 A1 May 19, 2022

(30) Foreign Application Priority Data

Nov. 19, 2020 (JP) ................................. 2020-192244

(51) Int. Cl.
*G03G 15/00* (2006.01)

(52) U.S. Cl.
CPC ..... *G03G 15/5095* (2013.01); *G03G 15/5029* (2013.01); *G03G 15/6508* (2013.01); *G03G 2215/00333* (2013.01); *G03G 2215/00734* (2013.01)

(58) Field of Classification Search
CPC ........... G03G 15/5029; G03G 15/6508; G03G 2215/00333; G03G 2215/00734
See application file for complete search history.

(56) References Cited

U.S. PATENT DOCUMENTS

2007/0263242 A1* 11/2007 Takahashi .......... H04N 1/00413 358/1.14
2011/0013210 A1* 1/2011 Yamaguchi .......... H04N 1/6097 358/1.9
2016/0039234 A1* 2/2016 Hirai ..................... G06F 3/1257 347/5

FOREIGN PATENT DOCUMENTS

CN 110501883 A * 11/2019 ......... G03G 15/5029
JP 2010-217742 9/2010
JP 2013-052597 3/2013

* cited by examiner

*Primary Examiner* — Ryan D Walsh
(74) *Attorney, Agent, or Firm* — LEX IP MEISTER, PLLC

(57) ABSTRACT

The image forming apparatus includes a paper feed unit that stores print paper used for printing, a paper size sensor that detects a paper size of the print paper stored in the paper feed unit, a filter information setting unit that sets filter information indicating the paper size detected by the paper size sensor in association with the paper feed unit, and a paper catalog list generating unit that extracts a paper catalog matching the filter information from paper catalogs included in predetermined paper catalog data and generates a paper catalog list using the extracted paper catalog.

5 Claims, 11 Drawing Sheets

FIG. 5

PAPER CATALOG

| NAME | SIZE | WEIGHT | DIRECTION |
|---|---|---|---|
| AAAAA A4 | A4 | 80 (g/m2) | LONG SIDE |
| AAAAA A4R | A4 | 80 (g/m2) | SHORT SIDE |
| AAAAA A3 | A3 | 80 (g/m2) | SHORT SIDE |
| BBBBB 90gsm A4 | A4 | 90 (g/m2) | LONG SIDE |
| BBBBB 90gsm A4R | A4 | 90 (g/m2) | SHORT SIDE |
| BBBBB 90gsm A3 | A3 | 90 (g/m2) | SHORT SIDE |

FIG. 6

PAPER CATALOG

| NAME | SIZE | WEIGHT | DIRECTION |
|---|---|---|---|
| AAAAAA4 | A4 | 80 (g/m2) | LONG SIDE |
| AAAAAA4R | A4 | 80 (g/m2) | SHORT SIDE |
| BBBBB 90gsm A4 | A4 | 90 (g/m2) | LONG SIDE |
| BBBBB 90gsm A4R | A4 | 90 (g/m2) | SHORT SIDE |
| BBBBB 100gsm A4 | A4 | 100 (g/m2) | LONG SIDE |
| BBBBB 100gsm A4R | A4 | 100 (g/m2) | SHORT SIDE |

IMAGE FORMING APPARATUS

INCORPORATION BY REFERENCE

This application is based upon and claims the benefit of priority from the corresponding Japanese Patent Application No. 2020-192244 filed on Nov. 19, 2020, the entire contents of which are incorporated herein by reference.

BACKGROUND

The present disclosure relates to image forming apparatuses.

A certain image forming apparatus can display a list screen of registered paper profiles.

Another image forming apparatus detects characteristics of paper conveyed by a media sensor, and automatically registers print condition settings based on the detected characteristics.

However, in a case where a list screen of registered paper profiles (also referred to as paper catalogs) is displayed, when a large number of paper profiles are registered, it takes time and effort to select a paper profile desired by the user, which is inconvenient.

If the setting of the paper conveyed is being transported is automatically registered, it is necessary to transport the paper in advance at least once, and it is possible that the setting desired by the user is not obtained, which is not preferable.

SUMMARY

An image forming apparatus according to present disclosure includes a paper feed unit to store sheets of paper used for printing, a paper size sensor to detect a paper size of the sheets of paper stored in the paper feed unit, a filter information setting unit to set filter information indicating the paper size detected by the paper size sensor in association with the paper feed unit and a paper catalog list generating unit to extract a paper catalog matching the filter information from paper catalogs included in predetermined paper catalog data and generate a paper catalog list using the extracted paper catalog.

BRIEF DESCRIPTION OF THE FIGURES

FIG. 5 is a figure illustrating an example of an unfiltered paper catalog list in the first embodiment.

FIG. 6 is a figure illustrating an example of a filtered paper catalog list in the first embodiment.

DETAILED DESCRIPTION

Embodiments of the present disclosure will be described below with reference to the figure.

First Embodiment

Figure 1:
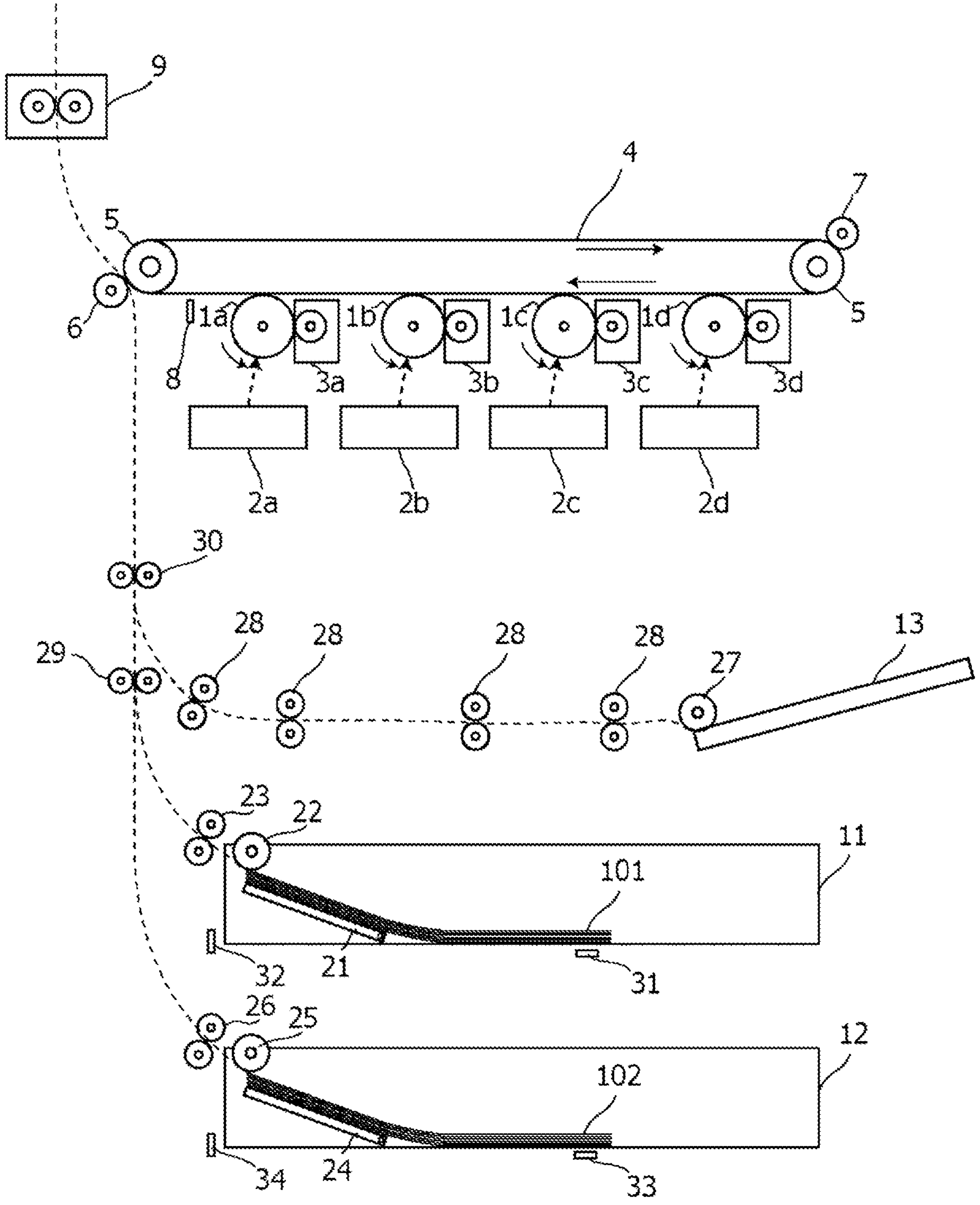
FIG. 1 is a side view illustrating a part of a mechanical internal configuration of the image forming apparatus according to an embodiment of the present disclosure.

FIG. 1 is a side view illustrating a part of a mechanical internal configuration of the image forming apparatus according to an embodiment of the present disclosure. The image forming apparatus shown in FIG. 1 is an apparatus having an electrophotographic printing function and typically is a printer, facsimile machine, copier, multifunction peripheral, or the like.

The image forming apparatus according to the present embodiment includes a tandem-type color developing device. The color developing device includes photosensitive drums 1*a* to 1*d*, exposure devices 2*a* to 2*d*, and developing units 3*a* to 3*d*. The photosensitive drums 1*a* to 1*d* are photoreceptors for four colors, namely, cyan, magenta, yellow, and black. The photosensitive drums 1*a* to 1*d* are made of, for example, amorphous silicon.

The exposure devices 2*a* to 2*d* irradiate the photosensitive drums 1*a* to 1*d* with laser light to form electrostatic latent images. The laser light is scanned in a direction (main scanning direction) perpendicular to the rotation direction (sub-scanning direction) of the photosensitive drums 1*a* to 1*d*. The exposure devices 2*a* to 2*d* each include a laser scanning unit including: a laser diode, which is the source of laser light; and optical elements (such as a lens, mirror, polygon mirror, etc.) to direct the laser light to a corresponding one of the photosensitive drums 1*a* to 1*d*.

A charger such as a scorotron, a cleaning device, a static eliminator, and the like are arranged around the photosensitive drums 1*a* to 1*d*. The cleaning device removes the residual toner on the photosensitive drums 1*a* to 1*d* after the first transfer, and the static eliminator eliminates the charge on the photosensitive drums 1*a* to 1*d* after the first transfer.

The developing units 3*a* to 3*d* each include a toner cartridge filled with toner of a respective one of four colors of cyan, magenta, yellow, and black, and a developing device that causes the toner conveyed from a toner hopper in the toner cartridge to adhere to the photosensitive drums 1*a* to 1*d*, and form a toner image by causing the toner to adhere to the electrostatic latent images on the photosensitive drums 1*a* to 1*d*. The toner is conveyed from the toner hopper to the developing device by a toner conveying portion operated by a driving device such as a motor not shown in figure.

Magenta development is performed by the photosensitive drum 1*a*, the exposure device 2*a* and the developing unit 3*a*. Cyan development is performed by the photosensitive drum 1*b*, the exposure device 2*b* and the developing unit 3*b*. Yellow development is performed by the photosensitive drum 1*c*, the exposure device 2*c* and the developing unit 3*c*. Black development is performed by the photosensitive drum 1*d*, the exposure device 2*d* and the developing unit 3*d*.

The intermediate transfer belt 4 is an annular image bearing member (intermediate transfer member) that contacts the photosensitive drums 1*a* to 1*d* and primarily transfers the toner image on the photosensitive drums 1*a* to 1*d*. The intermediate transfer belt 4 is stretched around the drive rollers 5, and is rotated by drive power from the drive rollers 5 in the direction from the contact position with the photosensitive drum 1*d* to the contact position with the photosensitive drum 1*a*.

As will be described later, the transfer roller 6 brings the conveyed paper into contact with the intermediate transfer belt 4, and secondarily transfers the toner image on the intermediate transfer belt 4 to the paper. The paper onto which the toner images are transferred is conveyed to a fixing device 9 that fixes the toner images to the paper.

A roller 7 is provided with a cleaning brush and brings the cleaning brush into contact with the intermediate transfer belt 4 to remove residual toner from the intermediate transfer belt 4 after the transfer of the toner images to the paper or after the calibration of the intermediate transfer belt 4.

The sensor 8 irradiates the intermediate transfer belt 4 with a light beam, and detects reflected light from the surface of the intermediate transfer belt 4 or a toner pattern on the surface thereof. In toner gradation calibration, for example, the sensor 8 directs the light beam toward a predetermined region (a region to which a toner patch for calibration is transferred) of the intermediate transfer belt 4, detects reflected light of the light beam, and outputs an electric signal according to the amount of light detected.

Further, the image forming apparatus according to this embodiment includes a plurality of paper feed cassettes 11, 12 and a manual feed tray 13.

The paper feed cassettes 11, 12 are paper feed units that store print paper used for printing.

The paper feed cassette 11 is openable and closable. In the open state, one or a plurality of print sheets of paper 101 of a certain size supplied by a user or the like are stacked, and in the closed state, the print paper 101 is pushed upward by the lift plate 21 and is brought into contact with the paper feed roller 22. The drive mechanism of the lift plate 21 is to mechanically push up the lift plate 21 when the paper feed cassettes 11 is closed, for example. The print paper 101 placed on the paper feed cassette 11 is fed one by one from above by the paper feed roller 22. The conveyance roller 23 is a roller that conveys the print paper 101 fed by the paper feed roller 22 from the paper feed cassette 11 one by one.

Similarly, the paper feed cassette 12 is openable and closable. In the open state, one or a plurality of print sheets of paper 102 of a certain size supplied by a user or the like are stacked, and in the closed state, the print paper 102 is pushed upward by the lift plate 24 and is brought into contact with the paper feed roller 25. The drive mechanism of the lift plate 24 is to mechanically push up the lift plate 24 when the paper feed cassette 12 is closed, for example. The print paper 102 placed in the paper feed cassette 12 is fed one by one from above by a paper feed roller 25. The conveyance roller 26 conveys the print paper 102 fed from the paper feed cassette 12 by the paper feed roller 25 one by one.

Sheets of paper are placed on the manual feed tray 13 by the user. The sheets of paper placed on the manual feed tray 13 are fed one by one by the paper feed roller 27. The conveyance roller 28 is a roller that conveys sheets of paper fed by the paper feed roller 27 from the manual feed tray 13 one by one.

The conveyance roller 29 is a conveyance roller on a conveyance path common to the print paper 101 conveyed from the paper feed cassette 11 and the print paper 102 conveyed from the paper feed cassette 12. The conveyance roller 30 is a conveyance roller on a conveyance path common to the print sheets of paper 101 and 102 conveyed from the paper feed cassettes 11, 12 and the paper conveyed from the manual feed tray 13. That is, when the paper feed cassette 11 is designated as a paper feed source at the time of printing, the print paper 101 is conveyed to a registration roller (not illustrated) in front of the transfer roller 6 by the conveyance rollers 23, 29, and 30. When the paper feed cassette 12 is designated as a paper feed source at the time of printing, the print paper 102 is conveyed to a registration roller (not illustrated) in front of the transfer roller 6 by the conveyance rollers 26, 29, and 30. When the manual feed tray 13 is designated as a paper feed source at the time of printing, the paper is conveyed to a registration roller (not illustrated) located in front of the transfer roller 6 by conveyance rollers 28 and 30.

Furthermore, a paper size sensor 31 that detects a paper size of the print paper 101 in the paper feed cassette 11 and an opening/closing sensor 32 that detects opening/closing of the paper feed cassette 11 are provided corresponding to the paper feed cassette 11. Similarly, a paper size sensor 33 that detects a paper size of the print paper 102 in the paper feed cassette 12 and an opening/closing sensor 34 that detects opening/closing of the paper feed cassette 12 are provided corresponding to the paper feed cassette 12.

The paper size sensors 31 and 33 detect the paper sizes of the print sheets of paper 101 and 102 stored in the paper feed cassettes 11, 12. For example, the paper size sensors 31 and 33 detect a paper size based on resistance values of variable resistors that operate in conjunction with positions of rear edge regulating guides that are slidable in the paper feed cassettes 11, 12 and fixed in accordance with rear edges of the print sheets of paper 101 and 102.

The opening/closing sensors 32 and 34 detect opening/closing of the paper feed cassettes 11, 12 (specifically, a change from an open state to a closed state). For example, the opening/closing sensors 32 and 34 include interlock switches that are in contact with side surfaces of the paper feed cassettes 11, 12, and detect whether the paper feed cassettes 11, 12 are in a position of a closed state or a position of an open state by the interlock switches.

Figure 2:
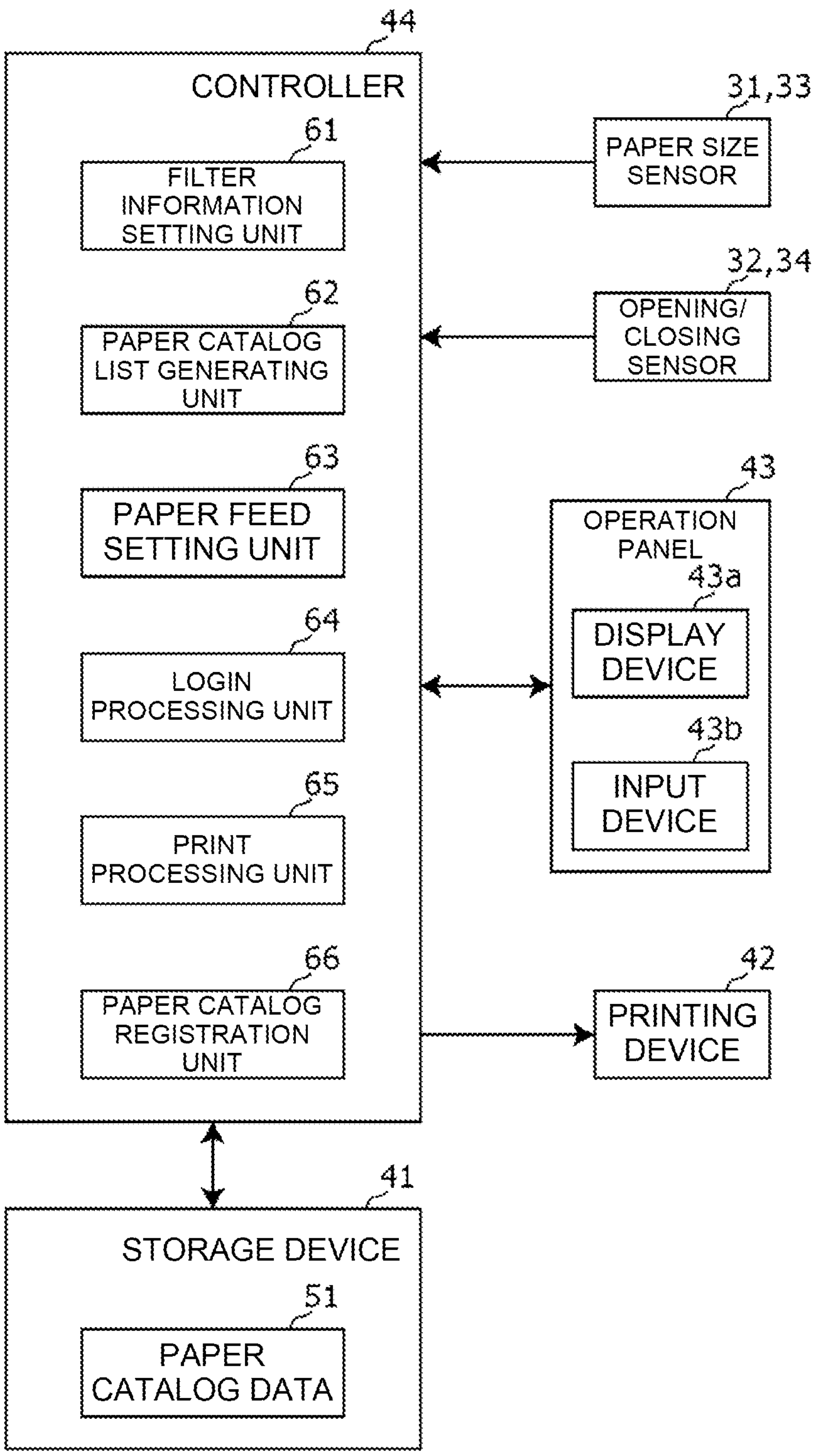
FIG. 2 is a block diagram illustrating a part of an electrical configuration of the image forming apparatus according to an embodiment of the present disclosure.

FIG. 2 is a block diagram illustrating a part of an electrical configuration of the image forming apparatus according to an embodiment of the present disclosure. As illustrated in FIG. 2, the image forming apparatus further includes a storage device 41, a printing device 42, an operation panel 43 and a controller 44.

The storage device 41 is a non-volatile storage device such as a flash memory and stores paper catalog data 51 including one or a plurality of paper catalogs.

The paper catalog data 51 includes a default paper catalog and a user paper catalog (a paper catalog registered by the user). The paper catalog of a sheet of paper includes attributes such as the name, size, basis weight, and direction of the paper.

The printing device 42 is an internal device that prints a document image with a mechanical configuration as illustrated in the FIG. 1.

The operation panel 43 includes a display device 43*a* such as a liquid crystal display that displays an operation screen for a user, and an input device 43*b* such as a touch panel or a hard key that receives a user operation.

The controller 44 comprises a computer, an ASIC (Application Specific Integrated Circuit) and the like, operates as various processing units by software and/or hardware, monitors and controls internal devices such as the printing device 42, and performs various kinds of data processing.

The controller 44 is a processing circuit that controls a drive source that drives the above-described roller and the like, a bias application circuit for applying a developing bias and a primary transfer bias, and an exposure device 2*a* to 2*d*, thereby to execute development, transfer, and fixing of a toner image, and paper feeding, printing, and paper ejection. The developing bias is applied between the photosensitive drums 1*a* to 1*d* and the developing units 3*a* to 3*d*, respectively, and the first transfer bias is applied between the photosensitive drums 1*a* to 1*d* and the intermediate transfer belt 4, respectively.

Furthermore, the controller 44 operates as a filter information setting unit 61, a paper catalog list generating unit 62, a paper feed setting unit 63, a login processing unit 64, a print processing unit 65 and a paper catalog registration unit 66.

The filter information setting unit 61 sets filter information indicating the paper sizes detected by the paper size sensors 31 and 33 in association with the paper feed cassettes 11, 12, respectively. The filter information associated with the paper feed cassettes 11, 12 is stored in the storage device 41 as setting data.

In this embodiment, the filter information setting unit 61 determines whether or not the paper sizes detected by the paper size sensors 31 and 33 are a predetermined standard size (such as B5, A3, A4, Letter), sets the filter information in association with the paper feed cassettes 11, 12 when the paper sizes detected by the paper size sensors 31 and 33 are the predetermined standard size, and does not set the filter information in association with the paper feed cassettes 11, 12 when the paper sizes detected by the paper size sensors 31 and 33 are not the predetermined standard size.

In this embodiment, the filter information setting unit 61 sets the filter information in association with the paper feed cassettes 11, 12 when the opening/closing of the paper feed cassettes 11, 12 is detected by the opening/closing sensors 32 and 34.

The paper catalog list generating unit 62 extracts a paper catalog matching the filter information from the paper catalogs included in the predetermined paper catalog data 51, generates a paper catalog list from the extracted paper catalog, and displays the paper catalog list on the display device 43*a* of the operation panel 43.

The paper feed setting unit 63 sets a paper catalog associated with the paper feed cassettes 11, 12. The paper catalog associated with the paper feed cassettes 11, 12 is stored in the storage device 41 as setting data.

The login processing unit 64 performs user authentication processing (determination of whether the input account information is valid or not) on the basis of the account information (user ID, password, etc.) of the registered user by an existing method for the user who has input the login request, permits login of the user who has been successfully authenticated in the user authentication processing, and enables execution of printing or the like in accordance with the request of the user.

The print processing unit 65 sets various print condition parameters on the basis of a paper catalog designated by the user or a paper catalog associated with the paper feed cassettes 11, 12 containing paper to be used for printing, and causes the printing device 42 to print an image designated by the user.

The paper catalog registration unit 66 registers a paper catalog designated by the user as a user paper catalog. To be specific, a paper catalog designated by a user operation on the input device 43*b* of the operation panel 43 is registered as the user paper catalog.

Next, the operation of the image forming apparatus according to the first embodiment will be described.

(a) Operation at the Time of Opening/Closing the Paper Feed Cassette

Figure 3:
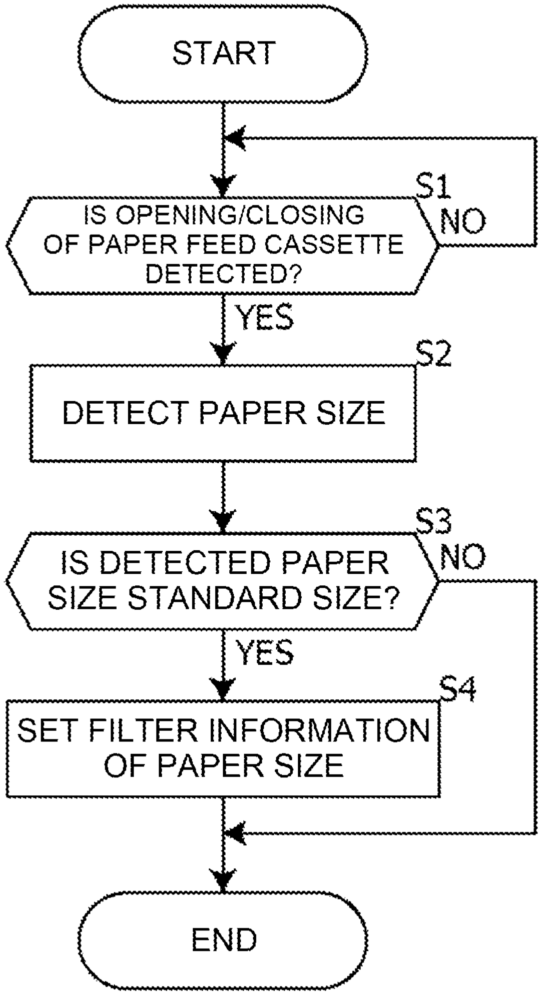
FIG. 3 is a flowchart illustrating an operation of the image forming apparatus when a paper feed cassette is opened/closed according to the first embodiment.

FIG. 3 is a flowchart illustrating the operation of the image forming apparatus according to the first embodiment when the paper feed cassette is opened/closed.

In the first embodiment, the filter information setting unit 61 monitors whether or not the opening/closing of the paper feed cassettes 11, 12 is detected by the opening/closing sensors 32 and 34 (step S1).

When the opening/closing of the paper feed cassettes 11, 12 is detected, the filter information setting unit 61 specifies the paper size detected by the paper size sensors 31 and 33 of the paper feed cassettes 11, 12 whose opening/closing is detected (step S2).

Then, the filter information setting unit 61 determines whether or not the designated paper size is a predetermined standard size (step S3), and when the designated paper size is the predetermined standard size, sets filter information including the designated paper size in association with the paper feed cassettes 11, 12 (step S4).

On the other hand, when the designated paper size is not the predetermined standard size, the filter information setting unit 61 does not set the filter information including the designated paper size in association with the paper feed cassettes 11, 12.

As described above, when the paper feed cassettes 11, 12 is opened/closed, since the stored sheets of paper may have been changed, the paper size is detected and the filter information is newly set or updated.

(b) An Operation to Display a Paper Catalog List

Figure 4:
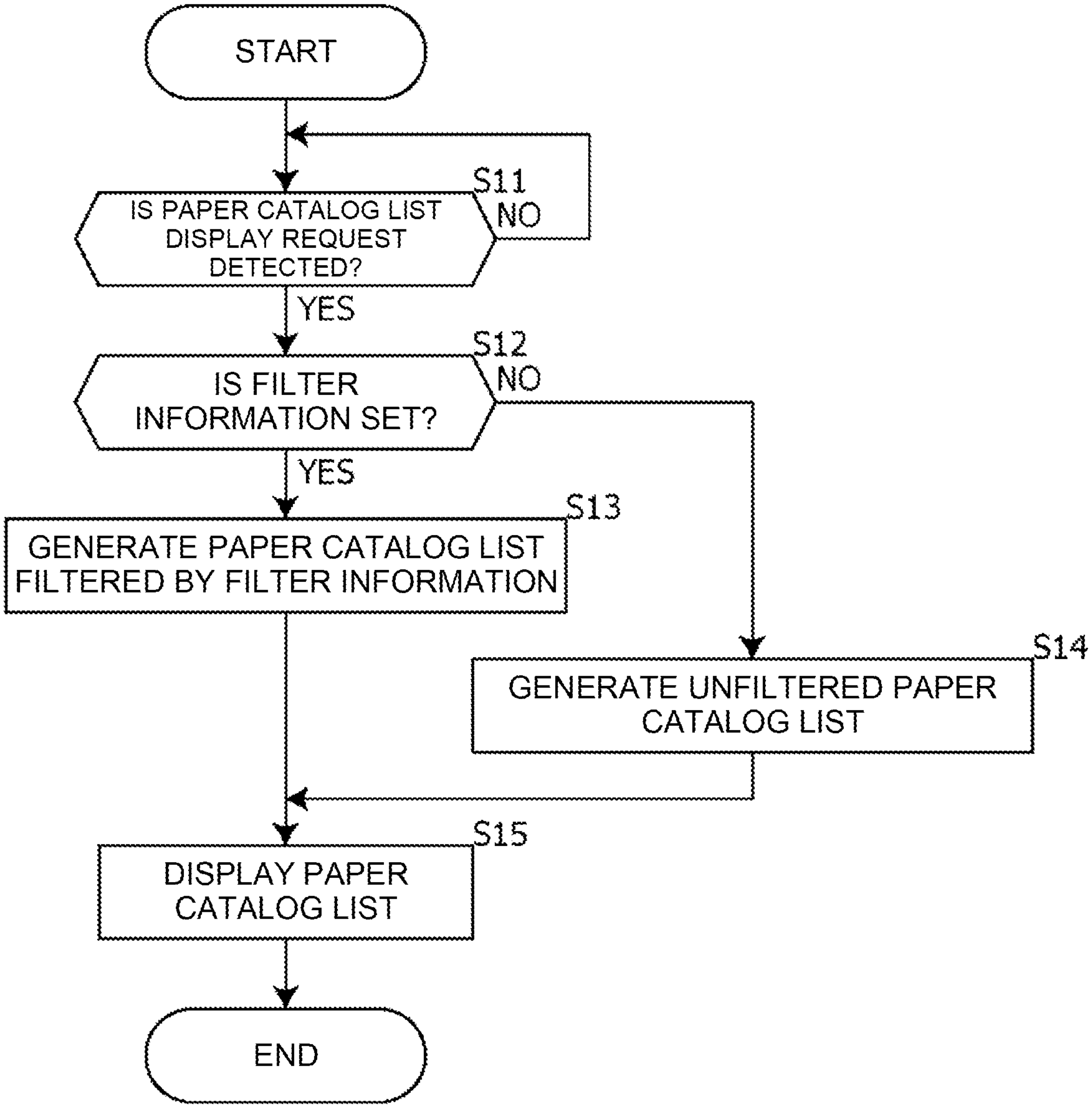
FIG. 4 is a flowchart illustrating the operation of the image forming apparatus when displaying a paper catalog list according to the first embodiment.

FIG. 4 is a flowchart illustrating the operation of the image forming apparatus according to the first embodiment when displaying a paper catalog list. FIG. 5 is a figure showing an example of an unfiltered paper catalog list in the first embodiment. FIG. 6 is a figure showing an example of a filtered paper catalog list in the first embodiment.

For example, when a paper catalog is associated with the paper feed cassettes 11, 12 or when a paper catalog designated by a print request is selected, a user operation is performed on the input device 43*b* of the operation panel 43 to display a paper catalog list.

The paper catalog list generating unit 62 monitors whether or not the user operation is detected by the input device 43*b* (step S11). When the user operation is detected in the input device 43*b*, the paper catalog list generating unit 62 determines whether or not the filter information is set to the paper feed cassettes 11, 12 designated by the user operation (step S1).

If the filter information is set for the designated paper feed cassettes 11, 12, the paper catalog list generating unit 62 extracts a paper catalog having a paper size matching the paper size designated by the filter information from the paper catalog data 51, and generates a paper catalog list including only the extracted paper catalog (from among the paper catalogs registered in the paper catalog data 51) (step S13).

On the other hand, when the filter information is not set in the designated paper feed cassettes 11, 12, the paper catalog list generating unit 62 generates a paper catalog list including all the paper catalogs registered in the paper catalog data 51 (step S14).

Then, the paper catalog list generating unit 62 displays the generated paper catalog list on the display device 43*a* of the operation panel 43 (step S15).

For example, compared with a paper catalog list of all paper catalogs registered in the paper catalog data 51, such as shown in the FIG. 5, a paper catalog list of paper catalogs filtered by paper size, such as shown in the FIG. 6, allows the user to simultaneously view more selectable paper catalogs on one screen.

As described above, according to the first embodiment, the paper size sensor 31 and 33 detect the paper sizes of the print sheets of paper 101 and 102 accommodated in the paper feed cassettes 11, 12, respectively. The filter information setting unit 61 sets filter information indicating the paper sizes detected by the paper size sensors 31 and 33 in association with the paper feed cassettes 11, 12. The paper catalog list generating unit 62 extracts a paper catalog matching the filter information from the paper catalogs included in the predetermined paper catalog data 51, and generates a paper catalog list using the extracted paper catalog.

As a result, since the paper catalog list does not include the paper catalogs that cannot be selected for the print sheets of paper 101 and 102 stored in the paper feed cassettes 11, 12, the convenience when the user checks the selectable paper catalogs increases.

Second Embodiment

In the image forming apparatus according to the second embodiment, when the opening/closing of the paper feed cassettes 11, 12 is detected by the opening/closing sensors 32 and 34, the paper catalog list generating unit 62 generates a paper catalog list, and the paper feed setting unit 63 sets a paper catalog selected by the user from the paper catalog list as a paper catalog associated with the paper feed cassettes 11, 12.

That is, each time the opening/closing of the paper feed cassette 11, 12 is detected, the paper catalog associated with the paper feed cassette 11, 12 whose opening/closing is detected is updated as necessary.

Figure 7:
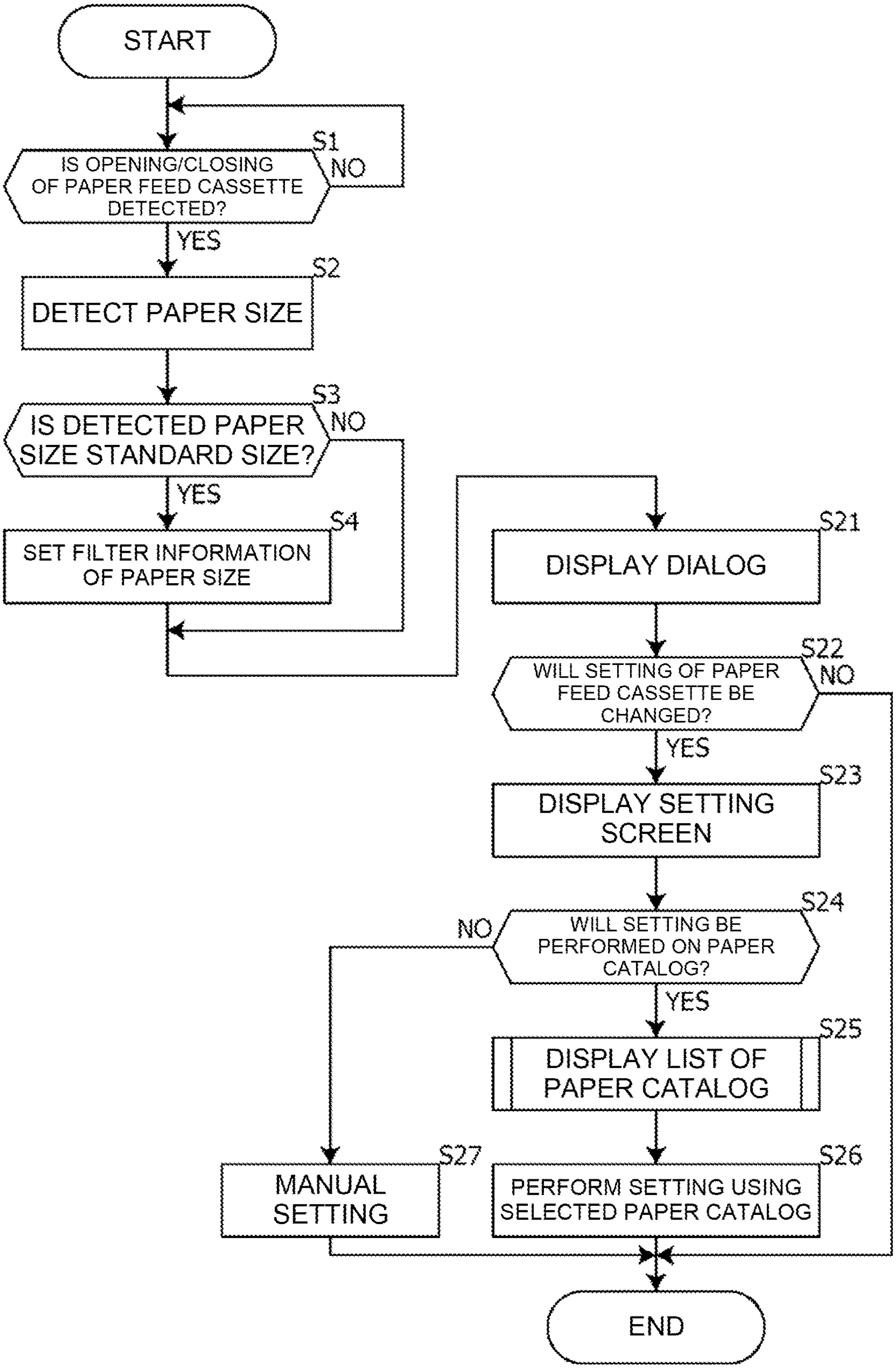
FIG. 7 is a flowchart illustrating an operation of the image forming apparatus when a paper feed cassette is opened/closed according to the second embodiment.
Figure 8:
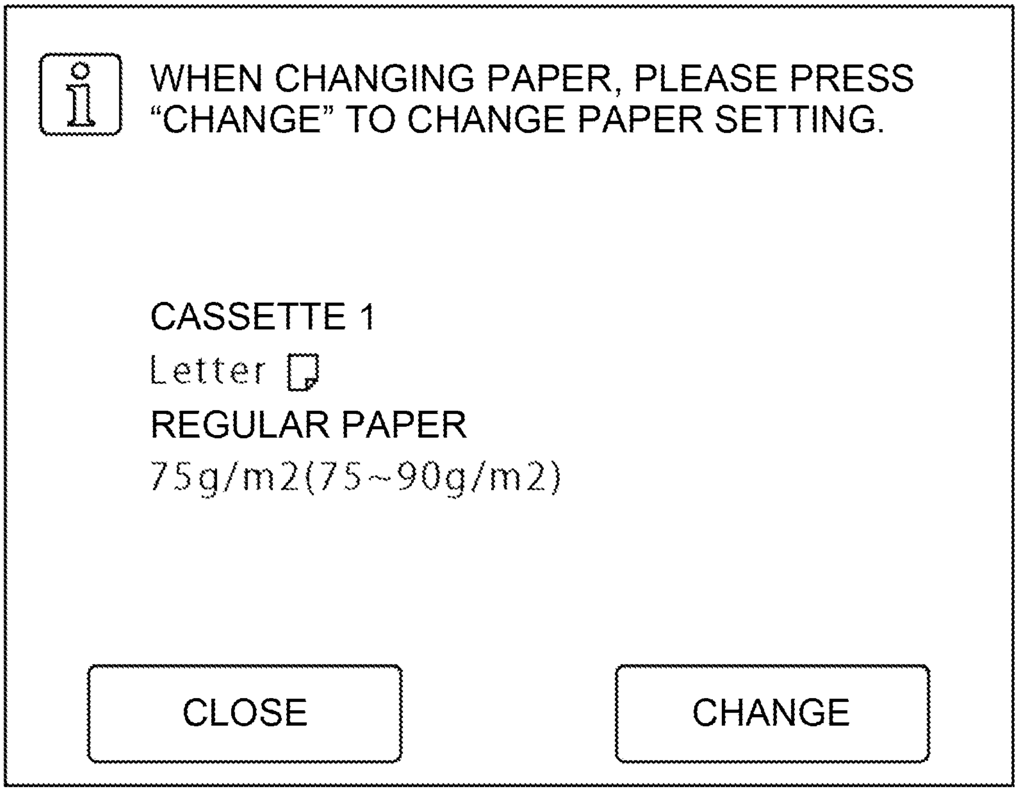
FIG. 8 is a figure illustrating an example of a dialog displayed when the paper feed cassette is opened and closed in the second embodiment.
Figure 9:
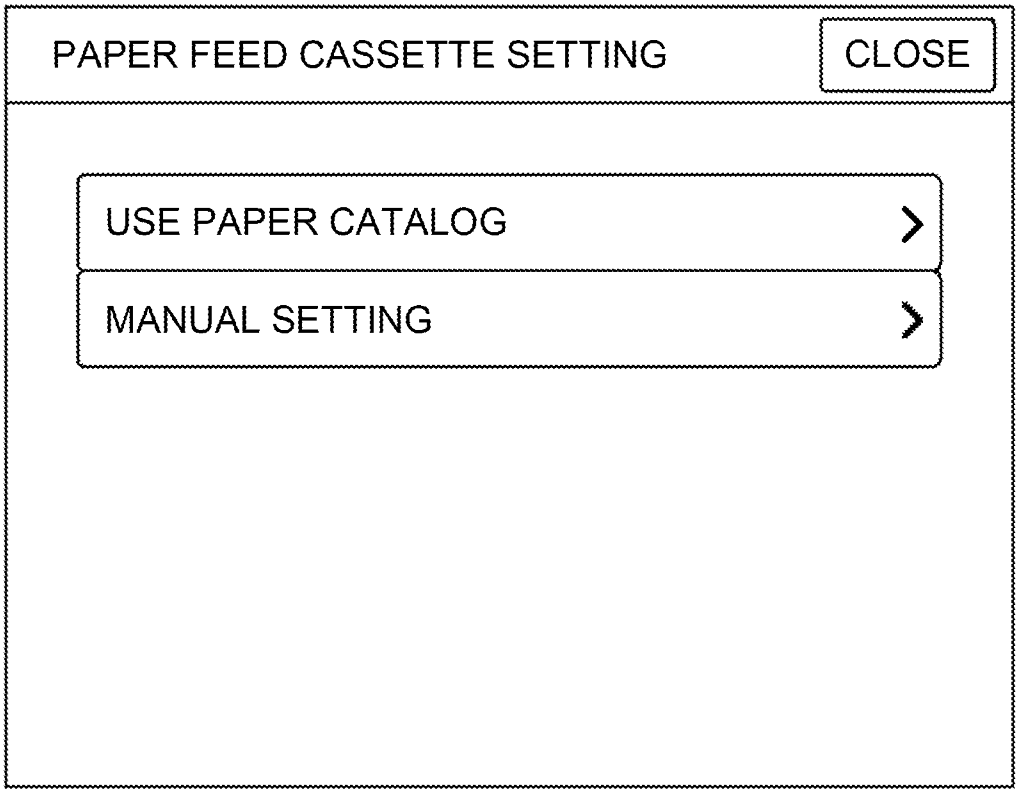
FIG. 9 is a figure illustrating an example of a setting screen displayed when the paper feed cassette is opened/closed in the second embodiment.

Next, an operation of the image forming apparatus when the paper feed cassette is opened/closed according to the second embodiment will be described. FIG. 7 is a flowchart illustrating the operation of the image forming apparatus when the paper feed cassette is opened/closed according to the second embodiment. FIG. 8 is a figure illustrating an example of a dialog displayed when the paper feed cassette is opened and closed in the second embodiment. FIG. 9 is a figure indicating an example of a setting screen displayed when the paper feed cassette is opened/closed in the second embodiment.

In the second embodiment, when the opening/closing sensors 32 and 34 detect the opening/closing of the paper feed cassettes 11, 12 (step S1), after the filter information is set according to the paper size (steps S2 to S4), the paper feed setting unit 63 displays a dialog for inquiring the user whether to change the paper setting associated with the paper feed cassettes 11, 12 whose opening/closing is detected in a pop-up form on the display device 43*a* of the operation panel 43 as shown in FIG. 8 (step S21).

When a user operation performed on the dialog is detected at the input device 43*b* of the operation panel 43, the paper feed setting unit 63 determines whether or not to change the paper setting, according to the user operation (step S22).

When it is determined that the paper setting is to be changed, the paper feed setting unit 63 displays a setting screen on the display device 43*a* of the operation panel 43 as shown in, for example, FIG. 9 (step S23).

When a user operation performed on the dialog is detected by the input device 43*b* of the operation panel 43, the paper feed setting unit 63 determines whether or not to perform paper setting using a paper catalog, in accordance with the user operation (step S24).

If it is determined to perform the paper setting using the paper catalog, the paper feed setting unit 63 instructs the paper catalog list generating unit 62 to generate and display a paper catalog list (the processes indicated in FIG. 4) (step S25).

When a user operation of selecting a paper catalog desired by the user from the paper catalog list is detected on the input device 43*b* of the operation panel 43, the paper feed setting unit 63 specifies the paper catalog selected by the user operation, associates the paper catalog with the paper feed cassette 11, 12 whose opening/closing is detected, and performs paper setting of the paper feed cassette 11, 12 (step S26).

On the other hand, in the step S24, when it is determined not to perform the paper setting using the paper catalog, the paper feed setting unit 63 performs the manual setting according to the user operation on the input device 43*b* of the operation panel 43 (step S27). In the manual setting, the value of each parameter in the paper catalog is input to the input device 43*b* by the user.

The other structural features and operations of the image forming apparatus according to the second embodiment are the same as those of the first embodiment, and thus descriptions thereof will be omitted.

As described above, according to the second embodiment, since the paper catalog associated with the paper feed cassette 11, 12 whose opening/closing is detected is updated as necessary each time the opening/closing of the paper feed cassette 11, 12 is detected, in a case where there are a plurality of paper feed cassettes 11, 12, it is not necessary for the user to select the paper feed cassette 11, 12 whose paper setting is to be updated and then update the paper catalog, and the user's convenience is improved.

Third Embodiment

In the image forming apparatus according to the third embodiment, the paper catalog list generating unit 62 generates a paper catalog list in which paper catalogs are arranged in an arrangement order based on the current count value of the number of printed sheets of paper for each paper type. Here, the arrangement order can be selected from an ascending order and a descending order by the user (user operation or user setting). In the default setting, for example, the arrangement order is set to a descending order.

That is, in a case where the arrangement order is descending, paper catalogs of paper types having a large number of print sheets of paper (that is, having a high frequency of use) are arranged first, and in a case where the arrangement order is ascending, paper catalogs of paper types having a small number of print sheets of paper (that is, having a low frequency of use) are arranged first. In a case where the arrangement order is an ascending order, since paper catalogs that are relatively recently registered are arranged first, the user sets the arrangement order in an ascending order in a case where the user wants to select a new paper catalog.

Specifically, a print counter for counting the number of prints is set for each paper catalog, and the count value is included in the paper catalog data 51. Every time printing of one sheet of paper is completed, the print processing unit 65 increases the count value of the paper catalog used for the printing by one. In a case where the paper catalog list is displayed, the paper catalog list generating unit 62 generates a paper catalog list in which paper catalogs are arranged in an arrangement order based on count values corresponding to the paper catalogs.

Figure 10:
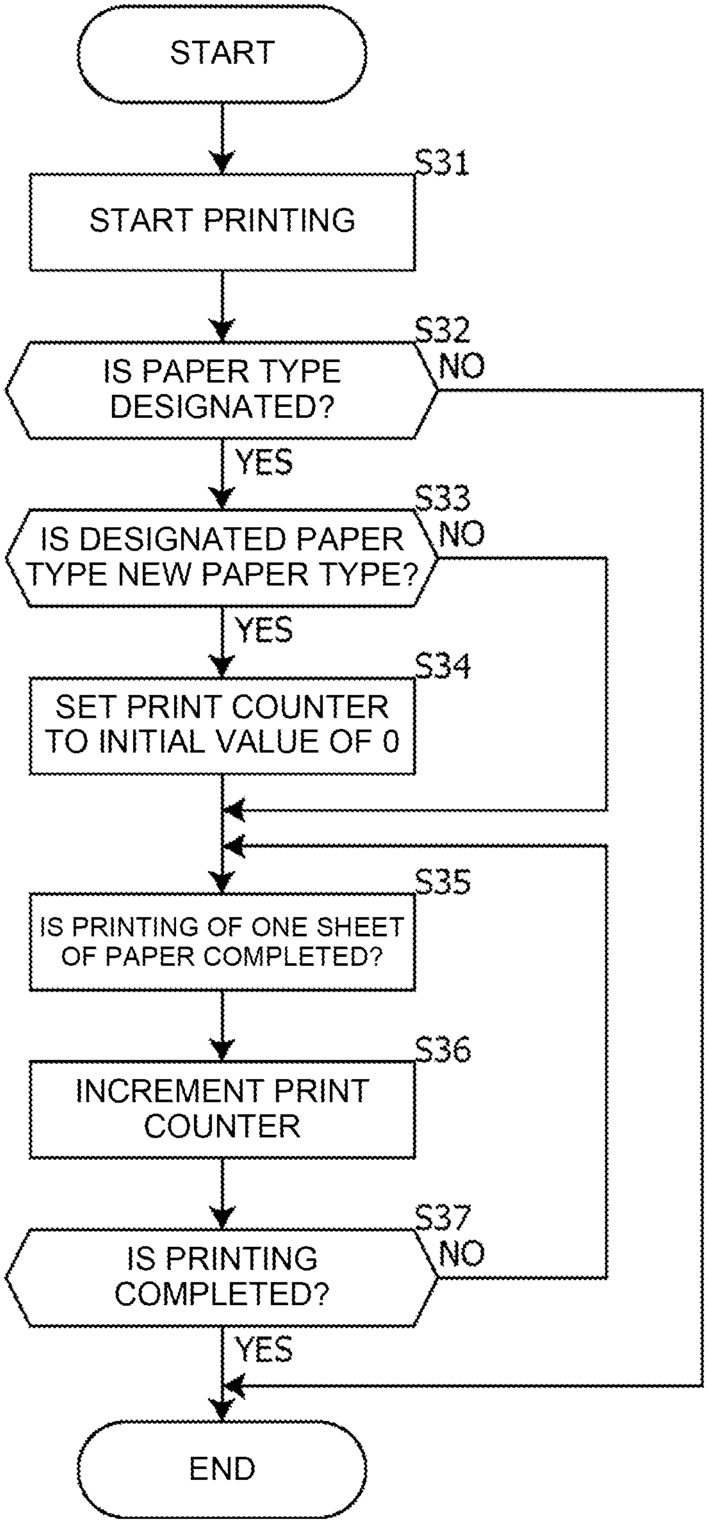
FIG. 10 is a flowchart illustrating an operation related to a print counter of the image forming apparatus according to the third embodiment.

Next, the operation of the print counter of the image forming apparatus according to the third embodiment will be described. FIG. 10 is a flowchart illustrating the operation related to the print counter of the image forming apparatus according to the third embodiment.

When starting printing based on a print request (step S31), the print processing unit 65 determines whether or not a paper type is designated in the print request (step S32). When the paper type is designated in the print request, the print processing unit 65 determines whether or not the designated paper type is a new paper type (whether or not a print counter is set) (step S33), and if the designated paper type is a new paper type, sets the print counter to an initial value of 0 (step S34).

If the paper type is designated in the print request, when printing of one sheet of paper using the paper of the paper type is completed (step S35), the print processing unit 65 increments the value of the print counter of the paper type by 1 (step S36). Until the printing based on the print request is completed, the print processing unit 65 increments the print counter every time the printing of one sheet of paper is completed.

In this manner, the number of prints of each paper type is cumulatively counted.

Since other configurations and operations of the image forming apparatus according to the third exemplary embodiment are similar to those of the first or second embodiment, descriptions thereof are omitted.

As described above, according to the third embodiment, since the arrangement order can be changed according to the tendency of a user's preference (such as whether a paper catalog with a high use frequency is displayed first or a new paper catalog is displayed first), user convenience is improved.

Fourth Embodiment

In the image forming apparatus according to the fourth embodiment, the paper catalog list generating unit 62 extracts a paper catalog matching the filter information from the user paper catalogs registered in the paper catalog data 51 and generates a paper catalog list using the extracted paper catalog. That is, among the paper catalogs registered in the paper catalog data 51, paper catalogs other than the paper catalog registered by the user are not included in the paper catalog list.

Specifically, when registering a user paper catalog, the paper catalog registration unit 66 includes account information (user ID or the like) of a user who registers the user paper catalog in the paper catalog data 51 in association with the user paper catalog, and the paper catalog list generating unit 62 extracts a user paper catalog associated with account information matching the account information (user ID or the like) of the logged-in user, extracts a paper catalog matching the filter information from the user paper catalogs extracted with the account information, and generates a paper catalog list using the extracted paper catalog. Therefore, the paper catalog registered by another user is not included in the paper catalog list.

Figure 11:
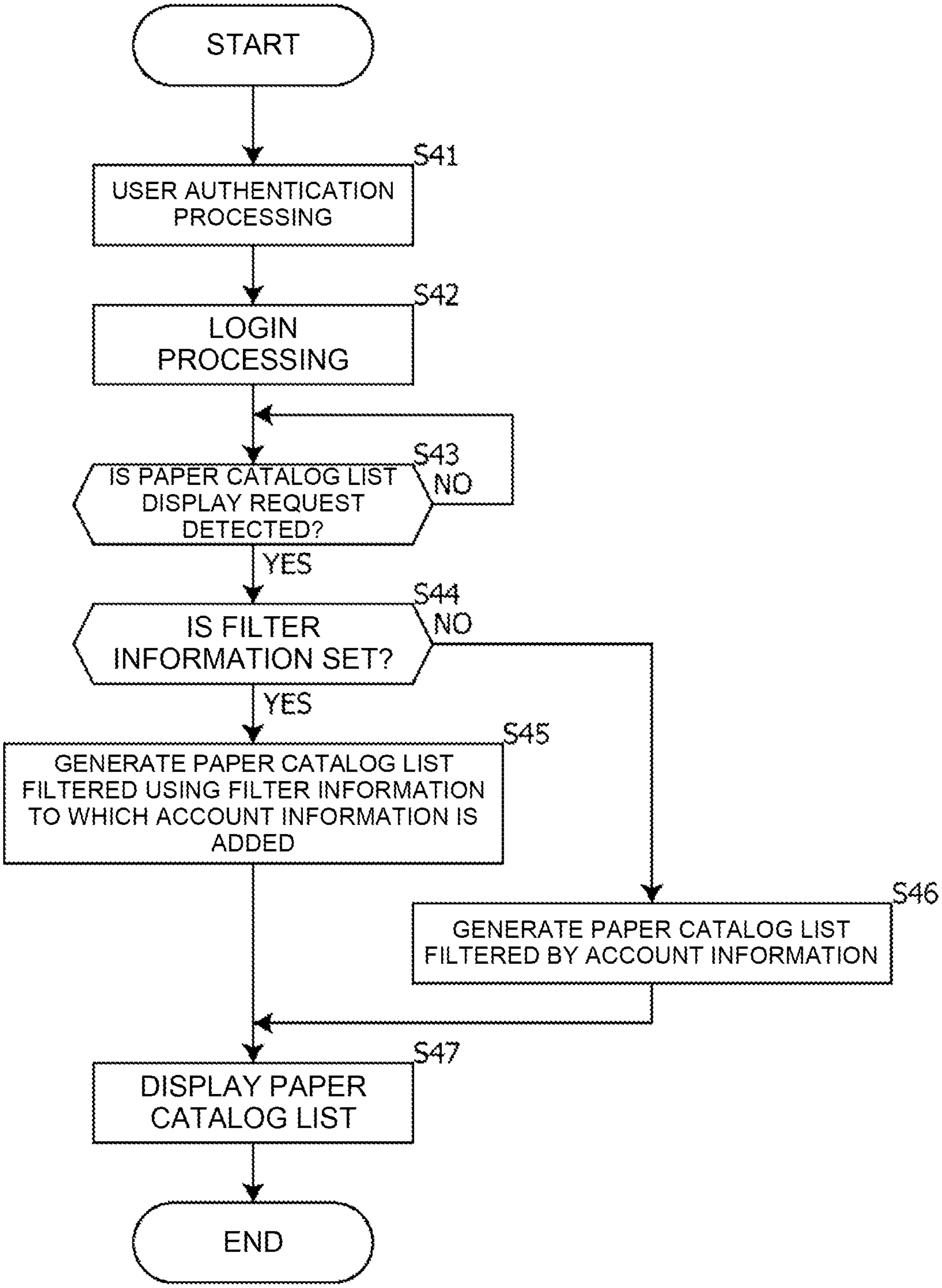
FIG. 11 is a flowchart illustrating an operation of the image forming apparatus when displaying a paper catalog list according to the fourth embodiment.

Next, an operation of the image forming apparatus according to the fourth embodiment when displaying a paper catalog list will be described. FIG. 11 is a flowchart illustrating the operation of the image forming apparatus when displaying the paper catalog list according to the fourth embodiment.

When the user wants to use the image forming apparatus, the user inputs account information on the login screen. The login processing unit 64 performs user authentication processing on the input account information (step S41), permits login of a user who has been successfully authenticated in the user authentication processing (step S42), and enters a state where printing or the like can be executed according to a user's request.

Thereafter, when the user (i.e. the login user) is in the login state (i.e. before logging out), for example, when a paper catalog is associated with the paper feed cassettes 11, 12 or when a paper catalog designated by a print request is selected, a user operation is performed on the input device 43*b* to display a paper catalog list.

The paper catalog list generating unit 62 monitors whether or not the user operation is detected by the input device 43*b* (step S43). When the user operation is detected in the input device 43*b*, the paper catalog list generating unit 62 determines whether or not the filter information is set to the paper feed cassette 11, 12 designated by the user operation (step S44).

When the filter information is set for the designated paper feed cassettes 11, 12, the paper catalog list generating unit 62 extracts a paper catalog having a paper size and account information that match the paper size designated by the filter information and the account information of the login user from the paper catalog data 51 and generates a paper catalog list including only the extracted paper catalog (step S45).

By contrast, if the filter information (the filter information of the paper size) is not set for the designated paper feed cassettes 11, 12, the paper catalog list generating unit 62 extracts the paper catalog whose account information corresponds to the account information of the login user from the paper catalog data 51, from among the paper catalogs registered in the paper catalog data 51 and generates a paper catalog list including only the extracted paper catalog (step S46).

Then, the paper catalog list generating unit 62 displays the generated paper catalog list on the display device 43*a* of the operation panel 43 (step S47).

Other configurations and operations of the image forming apparatus according to forth embodiment are the same as those of any one of first embodiments to third embodiment, and thus descriptions thereof are omitted.

As described above, according to the fourth embodiment, among paper catalogs selectable in terms of paper size, only paper catalogs registered by the user are displayed as a list, and it becomes easier for the user to select a desired paper catalog without any unnecessary paper catalog for the user being included in the list, thereby improving user convenience.

Various changes and modifications to the embodiments described above will be apparent to those skilled in the art. Such changes and modifications may be made without departing from the purpose and scope of the subject matter and without diminishing its intended advantages. That is, it is intended that such changes and modifications are included in the scope of the claims.

For example, in the above-described second embodiment, if the paper size detected for the paper feed cassette 11, 12 whose opening/closing has been detected matches the paper size of the paper catalog currently associated with the paper feed cassette 11, 12 whose opening/closing has been detected, it is possible to arrange so that the paper feed setting unit 63 does not display the above-described dialog and does not change the setting of the paper feed cassette 11, 12 whose opening/closing has been detected.

In addition, in the first to third embodiments described above, among the paper catalogs selectable from the viewpoint of the paper size, the paper catalog registered by the user may be excluded, and only the paper catalog registered in advance as a default may be displayed in a list.

What is claimed is:

1. An image forming apparatus comprising:

a paper feed unit to store print sheets of paper to be used for printing;

a paper size sensor that detects a paper size of the print paper stored in the paper feed unit;

a filter information setting unit to set filter information indicating the paper size detected by the paper size sensor in association with the paper feed unit; and a paper catalog list generating unit to extract a paper catalog matching the filter information from paper catalogs included in predetermined paper catalog data and generates a paper catalog list using the extracted paper catalog.

2. The image forming apparatus according to claim 1, wherein the filter information setting unit determines whether the paper size detected by the paper size sensor is a predetermined standard size, sets the filter information in association with the paper feed unit when the paper size detected by the paper size sensor is the predetermined standard size, and does not set the filter information in association with the paper feed unit when the paper size detected by the paper size sensor is not the predetermined standard size.

3. The image forming apparatus according to claim 1, further comprising an opening/closing sensor to detect opening/closing of the paper feed unit and a paper feed setting unit to set a paper catalog associated with the paper feed unit, wherein the filter information setting unit sets filter information indicating the paper size detected by the paper size sensor in association with the paper feed unit when the opening/closing of the paper feed unit is detected by the opening/closing sensor, the paper catalog list generating unit generates the paper catalog list when the opening/closing of the paper feed unit is detected by the opening/closing sensor, and the paper feed setting unit sets a paper catalog selected by a user from the paper catalog list as a paper catalog associated with the paper feed unit when the opening/closing of the paper feed unit is detected by the opening/closing sensor.

4. The image forming apparatus according to claim 1, wherein the paper catalog list generating unit generates a paper catalog list in which the paper catalogs are arranged in an arrangement order based on a current count value of the number of prints for each paper type, and the arrangement order is selected by a user from an ascending order and a descending order.

5. The image forming apparatus according to claim 1, further comprising a paper catalog registration unit that registers a paper catalog designated by a user as a user paper catalog, wherein the paper catalog list generating unit extracts a paper catalog that matches the filter information from the registered user paper catalogs and generates a paper catalog list using the extracted paper catalog.

* * * * *